(12) United States Patent
Conway

(10) Patent No.: US 9,105,067 B2
(45) Date of Patent: Aug. 11, 2015

(54) NETWORK RESOURCE PRE-BOOKING

(71) Applicant: Verizon Patent and Licensing Inc., Basking Ridge, NJ (US)

(72) Inventor: Adrian E. Conway, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 242 days.

(21) Appl. No.: 13/868,610

(22) Filed: Apr. 23, 2013

(65) Prior Publication Data

US 2014/0315564 A1 Oct. 23, 2014

(51) Int. Cl.
*H04W 72/04* (2009.01)
*G06Q 50/00* (2012.01)
*H04W 4/02* (2009.01)
*H04W 28/26* (2009.01)

(52) U.S. Cl.
CPC ............... *G06Q 50/00* (2013.01); *H04W 4/02* (2013.01); *H04W 28/26* (2013.01); *H04W 72/04* (2013.01)

(58) Field of Classification Search
CPC ...... H04W 72/048; H04W 4/028; H04W 4/18; H04W 4/02; H04L 67/18
USPC .............. 455/450–452.2, 456.1–456.6
See application file for complete search history.

(56) References Cited

U.S. PATENT DOCUMENTS

| | | | |
|---|---|---|---|
| 2002/0082009 A1* | 6/2002 | Ikeda et al. | 455/433 |
| 2002/0198991 A1* | 12/2002 | Gopalakrishnan et al. | 709/225 |
| 2009/0203388 A1* | 8/2009 | Karaoguz | 455/456.3 |

* cited by examiner

*Primary Examiner* — Kashif Siddiqui

(57) ABSTRACT

A base station associated with a cellular network may receive a request for a service from a user device. The base station may determine a current location of the user device. The base station may determine, based on the current location, a set of future locations for the user device. The base station may generate a set of schedules for the current location and the set of future locations. The set of schedules may allocate network resources to the user device at the current location and at each future location of the set of future locations. The base station may transmit the set of schedules to the user device.

20 Claims, 13 Drawing Sheets

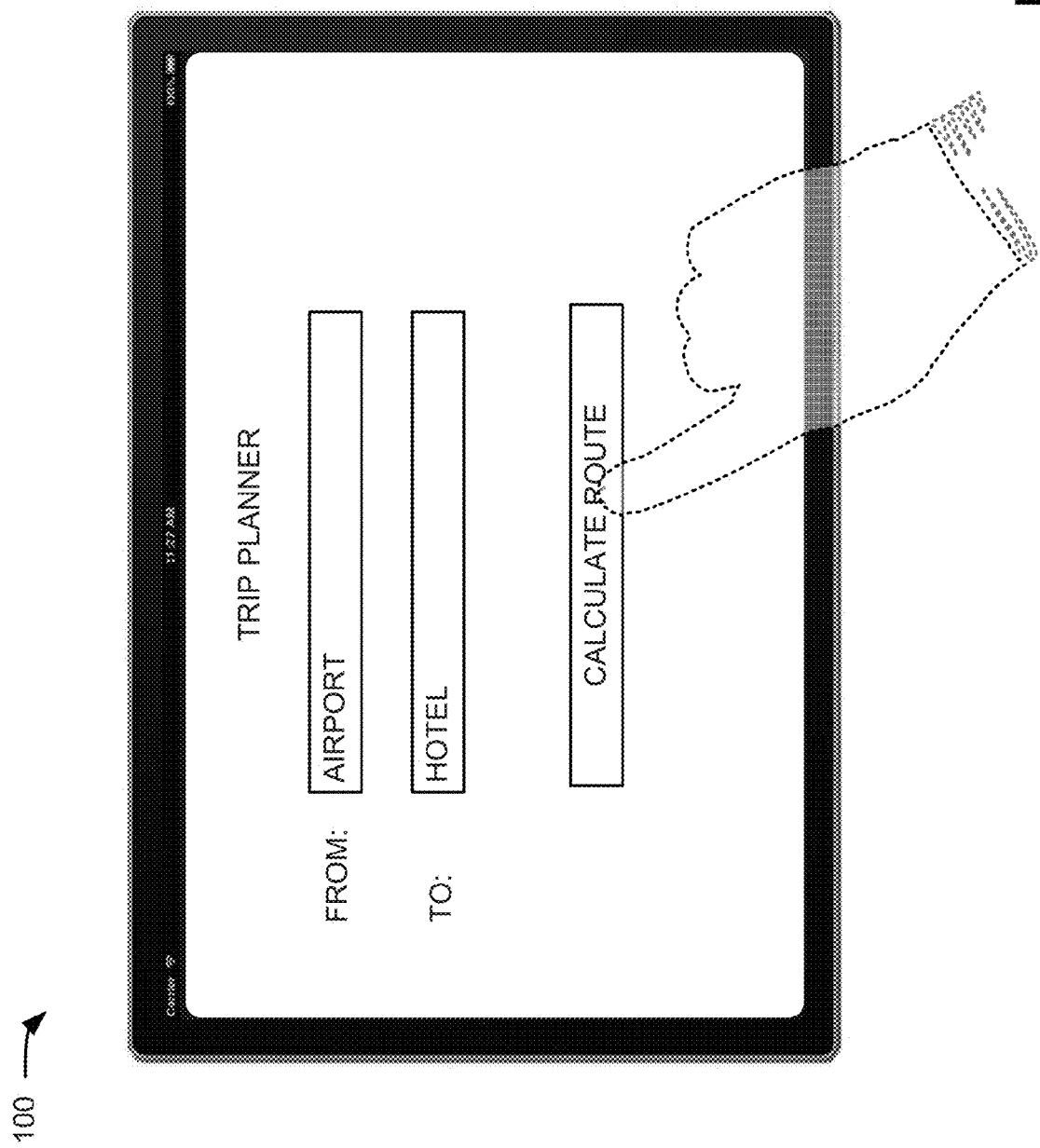

NETWORK RESOURCE PRE-BOOKING

BACKGROUND

A user may use a user device to perform various tasks (e.g., sending and/or receiving electronic mail (e-mail) messages, placing telephone calls to other user devices, browsing the internet, etc.). The user device may connect to a cellular network, via one of multiple base stations, to send and receive data associated with performing a task.

BRIEF DESCRIPTION OF THE DRAWINGS

FIGS. 1A-1C are diagrams illustrating an overview of a network pre-booking system according to implementations described herein;

DETAILED DESCRIPTION OF PREFERRED EMBODIMENTS

The following detailed description refers to the accompanying drawings. The same reference numbers in different drawings may identify the same or similar elements.

Systems and/or methods described herein may pre-book (e.g., allocate and/or reserve) network resources for user devices. Pre-booking network resources may ensure that a user receives a particular quality of service and may allow for wireless network resources, radio access network (RAN) resources, and/or long term evolution (LTE) network resources (herein referred to collectively as network resources and individually as network resource) to be more efficiently allocated among user devices.

Figure 1B:
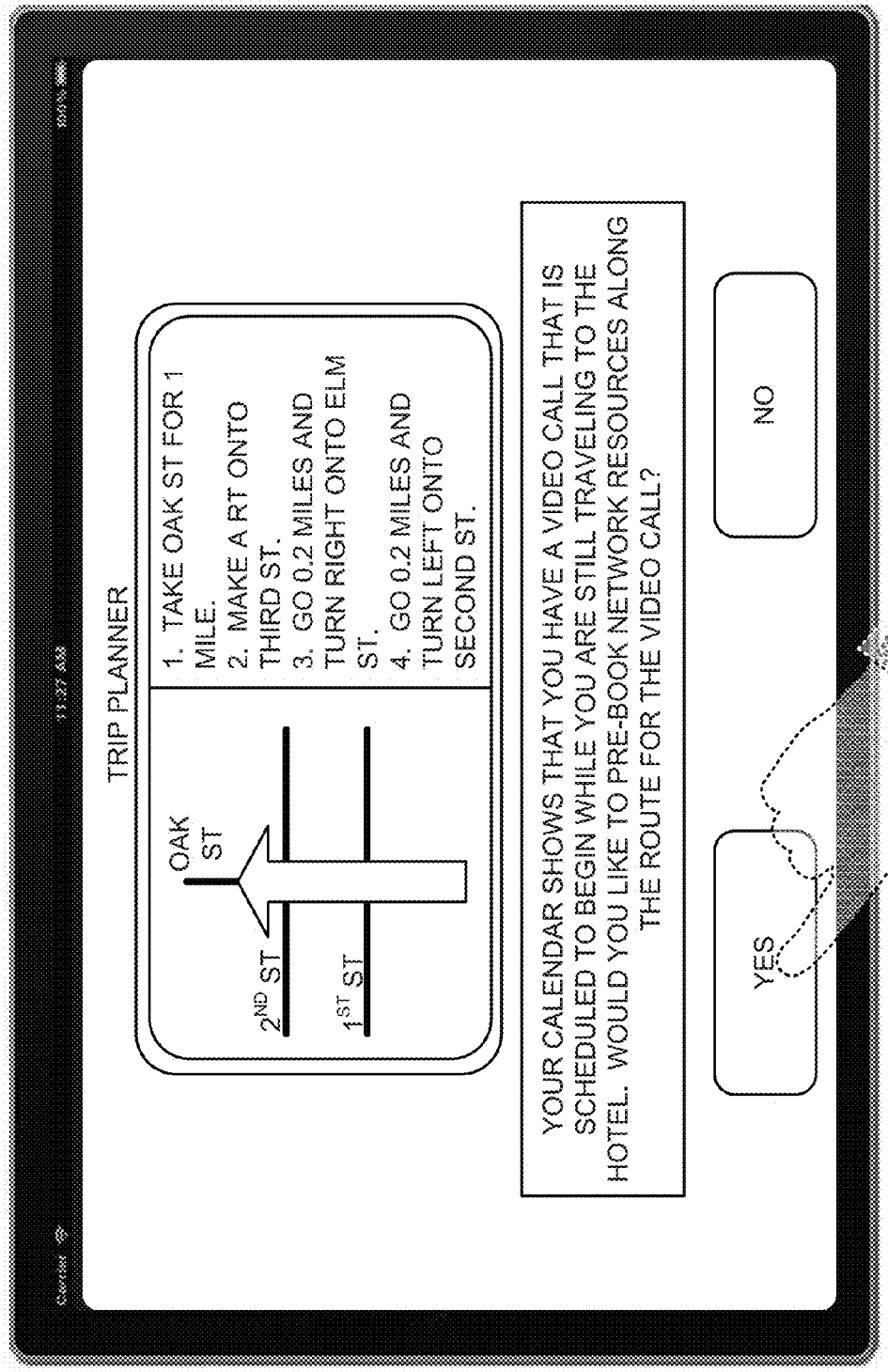
Figure 1C:
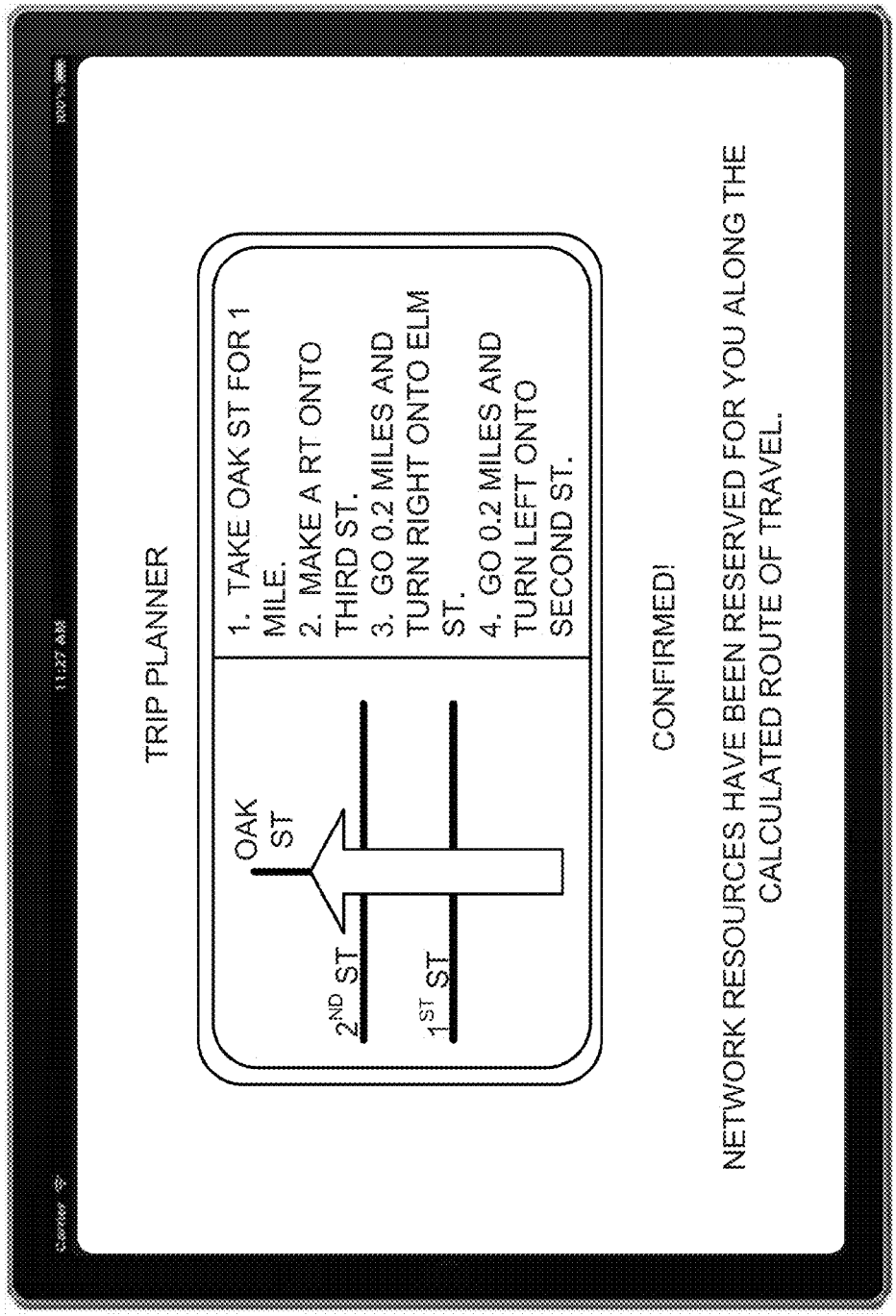

FIGS. 1A-1C are diagrams illustrating an overview of a network resource pre-booking system according to implementations described herein. Referring to FIG. 1A, assume that a user is traveling on business and desires to obtain directions for traveling from the airport to a particular hotel. Assume that the user accesses an application "TRIP PLANNER" running on a user device. Further, assume that the user provides information identifying a starting point and an ending point for the directions via a user interface provided by the application. As shown in FIG. 1A, the user has entered information indicating that the application is to calculate directions for traveling from the airport to the hotel and the user selects the button "CALCULATE ROUTE."

For FIG. 1B, assume that the application has calculated the directions and has provided the directions to the user via the user device. Further, assume that the application has accessed a calendar associated with the user and has determined that the user is scheduled to participate in a video call. Assume also that the application has determined that the video call is scheduled to begin while the user is still traveling to the hotel. Referring now to FIG. 1B, the application may cause a message to be displayed to the user via the user device. The message may indicate that the video call is schedule to begin while the user is still traveling to the hotel and may ask the user whether the user would like to reserve network resources along the calculated route. As shown in FIG. 1B, the user indicates that the application should reserve network resources for the video call.

Referring now to FIG. 1C, assume that the application provides information regarding reserving the network resources to a service provider providing a service for reserving network resources. Further, assume that the service provider receives the information from the application and causes base stations providing service along the route to reserve network resources. As shown in FIG. 1C, the application may output a message confirming that the network resources have been reserved along the calculated route of travel.

Figure 2:
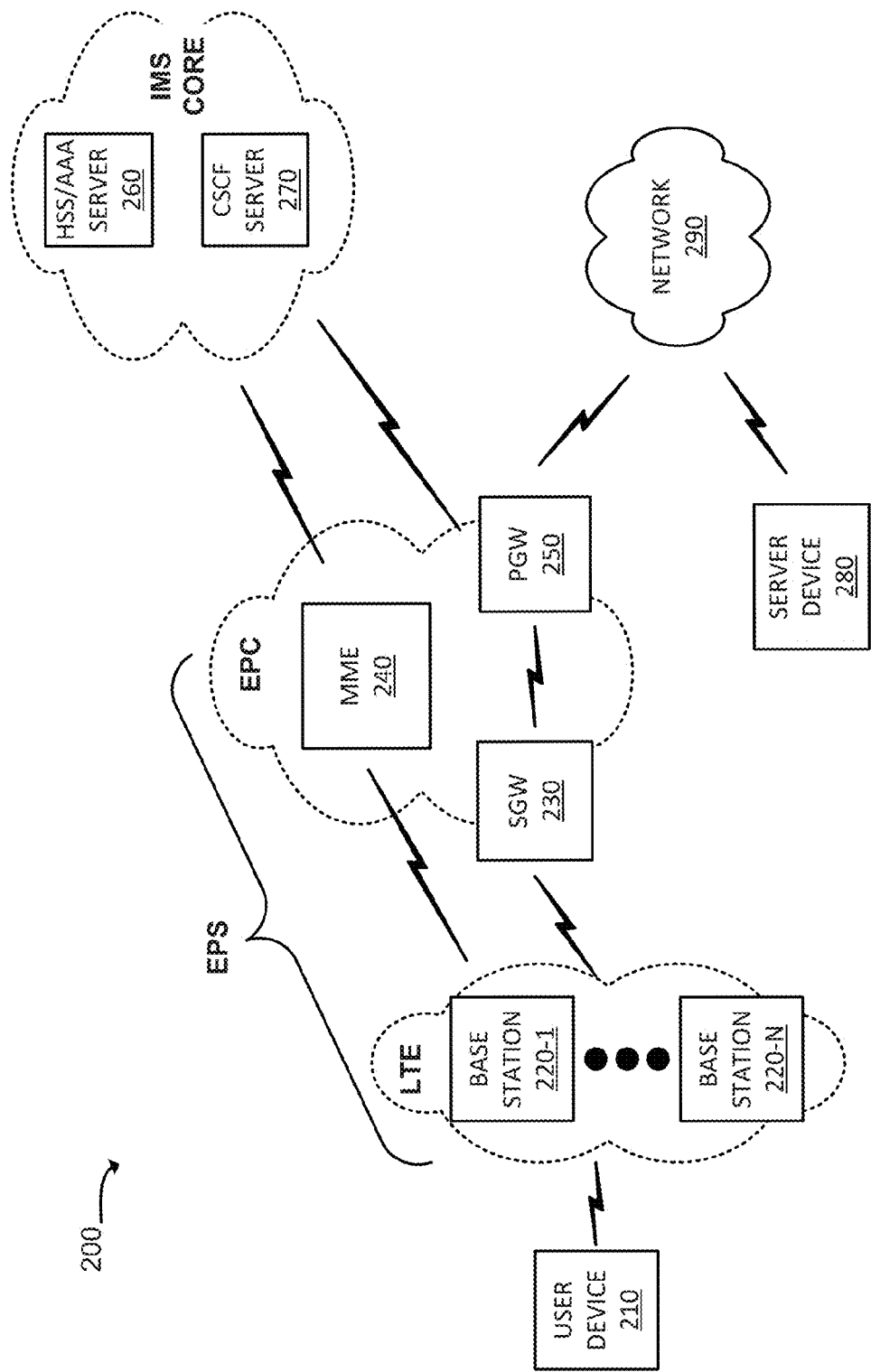
FIG. 2 is a diagram of an environment in which systems and/or methods, described herein, may be implemented.

FIG. 2 is a diagram of an example environment 200 in which systems and/or methods described herein may be implemented. As shown in FIG. 2, environment 200 may include a user device 210, a set of base stations 220-1 through 220-N (where N≥1) (hereinafter referred to collectively as base stations 220 and individually as base station 220), a serving gateway (SGW) 230, a mobility management entity (MME) device 240, a packet data network (PDN) gateway (PGW) 250, a home subscriber server (HSS)/authentication, authorization, accounting (AAA) server 260, a call session control function (CSCF) server 270, a server device 280, and a network 290.

Environment 200 may include an evolved packet system (EPS) that includes a LTE network and/or an evolved packet core (EPC) that operate based on a third generation partnership project (3GPP) wireless communication standard. The LTE network may be a RAN that includes one or more base stations 220, some or all of which, take the form of an eNodeB (eNB) via which user device 210 communicates with the EPC. The EPC may include SGW 230, MME 240, and/or PGW 250 that enable user device 210 to communicate with network 290 and/or an Internet protocol (IP) multimedia subsystem (IMS) core. The IMS core may include HSS/AAA server 260 and/or CSCF server 270 and may manage authentication, session initiation, account information, profile information, etc., associated with user device 210.

User device 210 may include a device that is capable of communicating with base station 220. Examples of user device 210 may include a mobile communication device, such as a radiotelephone; a personal communications system (PCS) terminal that may, for example, combine a cellular radiotelephone with data processing and data communications capabilities; a personal digital assistant (PDA) that can include, for example, a radiotelephone, a pager, Internet/intranet access, etc.; a wireless device; a smart phone; a laptop computer with a wireless air card; a tablet computer; a global positioning system (GPS) device; a content recording device (e.g., a camera, a video camera, etc.); a voice over Internet protocol (VoIP) device; an analog terminal adaptor (ATA); a personal computer; a set-top-box (STB); a television; a gaming system; etc. and/or other type of device capable of communicating with base station 220.

Base station 220 may include a device, such as an eNB device, that receives voice and/or data from MME 240, SGW 230, and/or another device and transmits that voice and/or data to user device 210 via an air interface. Base station 220 may also include a device that receives voice and/or data from user device 210 over an air interface and transmits that voice and/or data to MME 240, SGW 230, and/or another device (such as another user device 210).

SGW 230 may include a data processing and/or traffic transfer device, such as a gateway, a router, a modem, a switch, a firewall, a network interface card (NIC), a hub, a bridge, a proxy server, an optical add-drop multiplexer (OADM), or some other type of device that processes and/or transfers traffic. In some implementations, SGW 230 may route traffic from user device 210, may act as a mobility anchor for a user plane during inter-base station handovers, and may act as an anchor for mobility between LTE and other 3GPP technologies.

MME 240 may include a device that manages mobility, user device 210 identities, and security parameters. MME 240 may perform one or more of the following functions: non-access stratum (NAS) signaling; NAS signaling security; security control; inter-core network signaling for mobility between 3GPP access networks; idle mode user device 210 reachability; tracking area list management (user device 210 in idle and active modes); handovers to and/or from the LTE network; roaming; traffic policing functions; authentication operations; bearer management functions; etc.

For example, MME 240 may facilitate the selection of a SGW 230 and/or PGW 250 to serve traffic to/from user device 210 and/or perform operations associated with handing off user device 210 from a first base station 220 to a second base station 220 (e.g., when user device 210 is exiting a cell associated with the first base station 220 and/or when user device 210 is entering a cell associated with the second base station 220).

PGW 250 may include a device that acts as a gateway for additional networks, such as, for example, network 290. PGW 250 may provide connectivity from user device 210 to external packet data networks by being the point of exit and entry of traffic for user device 210. PGW 250 may perform policy enforcement, packet filtering, and/or other services relating to the access of user device 210 to the external packet data network.

HSS/AAA server 260 may include one or more server devices, or other types of computation or communication devices, that manage, update, and/or store, in a memory associated with HSS/AAA server 260, profile information associated with user device 210 that identifies applications and/or services that are permitted for and/or accessible by user device 210, information associated with a user of user device 210 (e.g., a username, a password, a personal identification number ("PIN"), etc.), rate information, minutes allowed, and/or other information. Additionally, or alternatively, HSS/AAA server 260 may include a device that performs authentication, authorization, and/or accounting operations associated with a communication session with user device 210.

CSCF server 270 may include a server device, or other type of computation or communication device, that processes and/or routes voice calls to and from user device 210 via the EPC. For example, CSCF server 270 may process voice calls received from network 290 that are destined for user device 210 and/or may process voice calls received from user device 210 that are destined for network 290.

Server device 280 may include a computing device, such as a server device or a collection of server devices. In some implementations, server device 280 may receive requests for reserving network resources from user device 210. Server device 280 may identify one or more locations and/or network cells associated with the request. Server device 280 may instruct one or more base stations 220, associated with the one or more locations and/or network cells, to reserve network resources based on the request.

Network 290 may include one or more wired and/or wireless networks. For example, network 290 may include a local area network (LAN), a wide area network (WAN), a metropolitan area network (MAN), a mesh network, an intranet, the Internet, a cellular network, an optical fiber (or fiber optic)-based network, a satellite network, and/or a combination of these or other types of networks.

Although FIG. 2 shows example devices/networks of environment 200, in some implementations, environment 200 may include fewer devices/networks, different devices/networks, differently arranged devices/networks, and/or additional devices/networks than those depicted in FIG. 2. Alternatively, or additionally, one or more devices/networks of environment 200 may perform one or more tasks described as being performed by one or more other devices/networks of environment 200.

Figure 3:
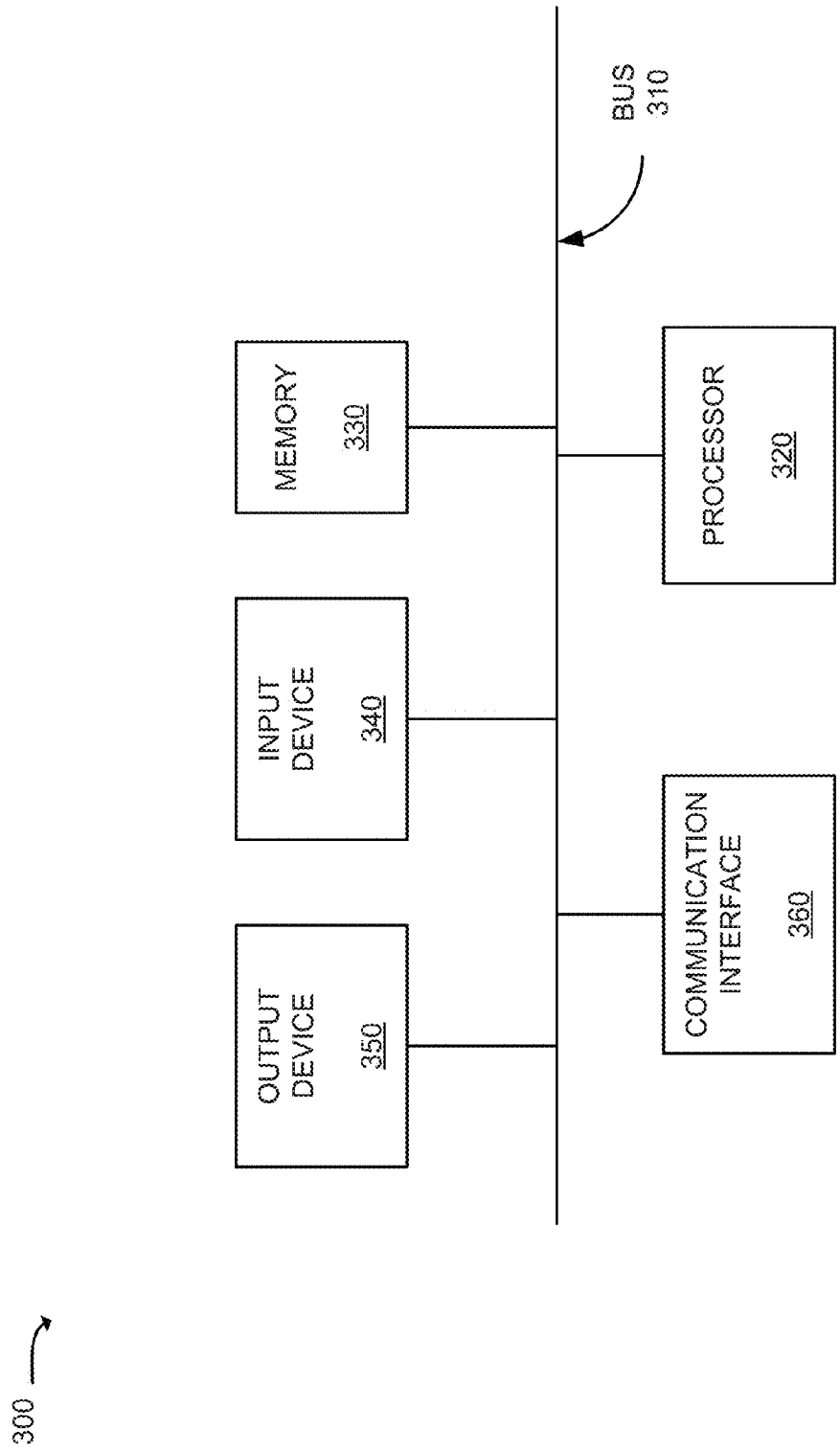
FIG. 3 illustrates example components of a device that may be used within the environment of FIG. 2 according to one or more implementations described herein.

FIG. 3 is a diagram of example components of a device 300 that may be used within environment 200. Device 300 may correspond to user device 210, SGW 230, MME 240, PGW 259, HSS/AAA server 260, CSCF server 270, and/or server device 280. Additionally, or alternatively, each of user device 210, SGW 230, MME 240, PGW 259, HSS/AAA server 260, CSCF server 270, and/or server device 280 may include one or more devices 300 and/or one or more components of device 300.

As shown in FIG. 3, device 300 may include bus 310, processor 320, memory 330, input device 340, output device 350, and communication interface 360. Bus 310 may include a path that permits communication among the components of device 300. Processor 320 may include a processor, a microprocessor, an application specific integrated circuit (ASIC), a field programmable gate array (FPGA), or another type of processor that interprets and executes instructions. Memory 330 may include a random access memory (RAM) or another type of dynamic storage device that stores information or instructions for execution by processor 320, a read-only memory (ROM) or another type of static storage device that stores static information or instructions for processor 320, and/or a magnetic storage medium, such as a hard disk drive, or a removable memory, such as a flash memory.

Input device 340 may include a mechanism that permits an operator to input information to device 300, such as a control button, a keyboard, a keypad, a touch screen interface, a microphone, a camera, a video recorder, or another type of input device. Output device 350 may include a mechanism that outputs information to the operator, such as a light emitting diode (LED), a display, a speaker, or another type of output device. Communication interface 360 may include any transceiver-like mechanism that enables device 300 to communicate with other devices or networks. In one implementation, communication interface 360 may include a wireless interface, a wired interface, or a combination of a wireless interface and a wired interface.

Device 300 may perform certain operations, as described in detail below. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices.

The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. In some implementations, one or more components of device 300 may perform one or more tasks described as being performed by one or more other components of device 300.

Figure 4:
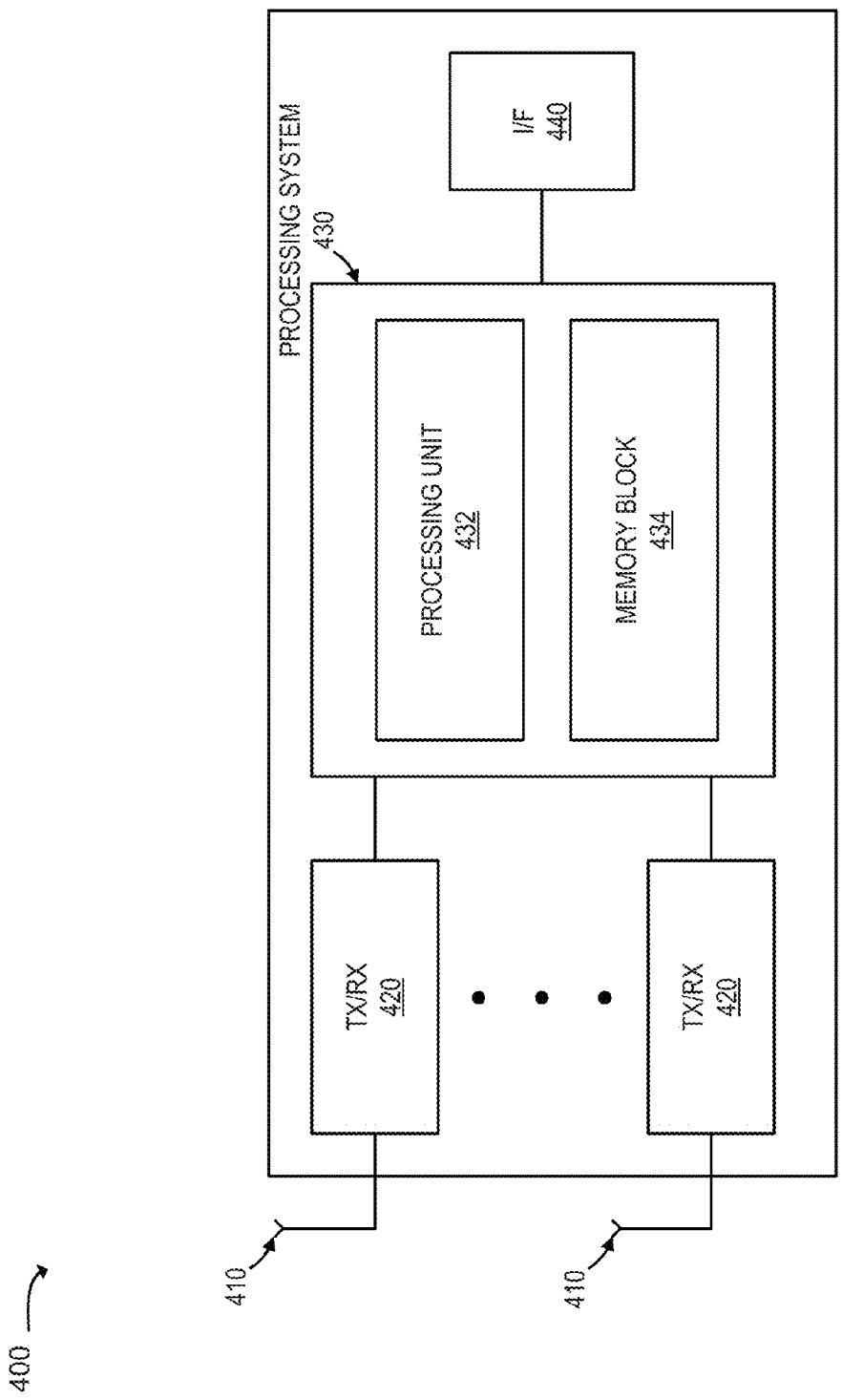
FIG. 4 illustrates other example components of a device that may be used within the environment of FIG. 2 according to one or more implementations described herein.

FIG. 4 is a diagram of example components of a device 400 that may be used within environment 200. Device 400 may correspond to base station 220. Additionally, or alternatively, base station 220 may include one or more devices 400 and/or one or more components of device 400.

As shown in FIG. 4, device 400 may include antennas 410, transceivers (TX/RX) 420, a processing system 430, and an interface (I/F) 440. Antennas 410 may include one or more directional and/or omni-directional antennas. Transceivers 420 may be associated with antennas 410 and may include transceiver circuitry for transmitting and/or receiving traffic within a network, such as a wireless network, via antennas 410.

Processing system 430 may control the operation of device 400. Processing system 430 may also process information received via transceivers 420 and interface 440. Processing system 430 may further measure quality and strength of a connection, and/or may determine position information for user device 210, such as, for example, a current position of user device 210, a set of future positions of user device 210, a speed of travel of user device 210, a direction of travel of user device 210, etc.

As shown in FIG. 4, processing system 430 may include a processing unit 432 and a memory block 434. Processing unit 432 may include one or more processors, microprocessors, etc, and may process information received via transceivers 420 and interface 440. The processing may include, for example, data conversion, forward error correction (FEC), rate adaptation, a spreading/dispreading operation, and a modulation operation, etc.

Memory block 434 may include any type of dynamic storage device that may store information and instructions, for execution by processing unit 432, and/or any type of non-volatile storage device that may store information for use by processing unit 432. Interface 440 may include one or more input/output components that allow device 400 to transmit data to and receive data from SGW 230, MME 240, server device 280, etc.

Device 400 may perform certain operations, as described in detail below. Device 400 may perform these operations in response to processor 420 executing software instructions contained in a computer-readable medium, such as memory block 434. The software instructions may be read into memory block 434 from another computer-readable medium or from another device via transceivers 420 and/or interface 440. The software instructions contained in memory block 434 may cause processing unit 432 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in some implementations, device 400 may include fewer components, different components, differently arranged components, or additional components than depicted in FIG. 4. In some implementations, one or more components of device 400 may perform one or more tasks described as being performed by one or more other components of device 400.

Figure 5:
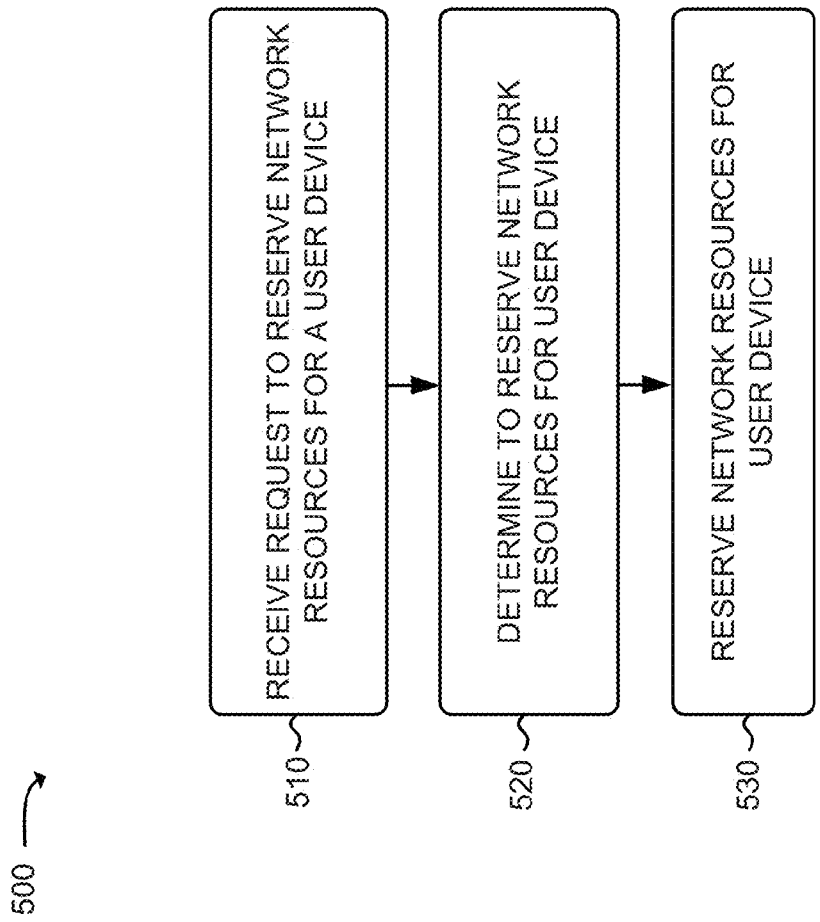
FIG. 5 is a flow chart of an exemplary process for reserving network resources.

FIG. 5 is a flow chart of an example process 500 for reserving network resources. In some implementations, process 500 may be performed by base station 220 and/or server device 280. In other implementations, one or more blocks of process 500 may be performed by one or more devices instead of, or possibly in conjunction with, base station 220 and/or server device 280.

As shown in FIG. 5, process 500 may include receiving a request to reserve network resources for user device 210 (block 510). For example, base station 220 may receive a request to reserve network resources for user device 210. In some implementations, base station 220 may receive a request to reserve network resources for user device 210 from user device 210. For example, user device 210 may obtain an application for reserving network resources by downloading the application via a network and/or accessing a memory (e.g., memory 330) of user device 210. The user may access the application and may provide information regarding reserving network resources. The application may generate a request based on the provided information and may cause user device 210 to send the request to base station 220.

In some implementations, a user may access the application via user device 210 to reserve network resources for user device 210. In some implementations, the user may access the application via user device 210 to reserve network resources for another user device 210. For example, the user may access the application at home using a desktop computer to reserve network resources for listening to a live streaming audio broadcast via a wireless mobile device (e.g., a tablet, a smart phone, etc.) while driving to work.

In some implementations, the request may include information identifying one or more users and/or information identifying one or more user devices 210 associated with reserving the network resources. For example, the request may include information identifying a particular user account and/or user profile (e.g., a name, a username, a password, account information, etc.) associated with the user and/or a group of users (e.g., family members, employees of a particular company, etc.), an identifier or other information identifying user device 210 and/or a group of user devices 210 (e.g., account information, a serial number, etc.), and/or other information for identifying users and/or user devices 210 associated with reserving the network resources.

In some implementations, the request may include information indicating where user device 210 will be located when utilizing the network resources and/or information indicating when user device 210 will be utilizing the network resources. For example, the request may include information indicating a geographic position (e.g., a physical address, an IP address, longitude/latitude coordinates, etc.) from which user device 210 will utilize the network resources, a route (e.g., a starting location, a destination location, and/or a path for traveling from the starting location to the destination location) user device 210 will be traveling when utilizing the network resources, and/or information indicating a period of time during which user device 210 will utilize the network resources.

In some implementations, the request may include information indicating a type of traffic to be transmitted between user device 210 and base station 220. For example, the request information identifying a type of service (e.g., a voice service, a unicast service, a broadcast service, and/or a multicast service) and/or information identifying a type of communication (e.g., making/receiving calls, sending/receiving messages (e.g., emails, text messages, etc.), accessing/interacting with the Internet, downloading/playing audio content and/or video content, making electronic purchases, communicating via social networking, etc).

Additionally, or alternatively, base station 220 may receive a request to reserve network resources from server device 280. For example, user device 210 may provide information regarding reserving network resources to server device 280. Server device 220 may identify one or more base stations (e.g., one or more base stations 220) for the request based on the received information. Server device 280 may generate a request to reserve network resources and may send the request to the one or more base stations 220.

Process 500 may include determining to reserve network resources for user device 210 (block 520). For example, base station 220 and/or server device 280 may determine to reserve network resources for user device 210. In some implementations, base station 220 and/or server device 280 may determine that user device 210 is subscribed to a particular service and may determine to reserve network resources for user device 210 based on user device 210 being subscribed to the particular service.

For example, the request to reserve network resources may include an identifier associated with a user and/or user device 210. Based on the identifier, base station 220 and/or server device 280 may authenticate the user and/or determine that the user/user device 210 has previously registered for a particular service and/or is subscribed with a particular service provider for reserving network resources. Base station 220 and/or server device 280 may determine to reserve network resources for user device 210 based on the user/user device 210 having previously registered for the particular service and/or being subscribed with the particular service provider.

In some implementations, base station 220 and/or server device 280 may determine that a user of user device 210 is a particular type of user. For example, base station 220 and/or server device 280 may determine that the user is an emergency responder (e.g., a police officer, a fire fighter, etc.), a government official, a diplomat, etc. Base station 220 and/or server device 280 may determine to reserve network resources for user device 210 based on the user being the particular type of user.

Process 500 may include reserving the network resources (block 530). For example, base station 220 may reserve network resources for user device 210 based on the request to reserve network resources. In some implementations, base station 220 may determine an allocation of network resources for user device 210. For example, the request to reserve network resources may include resource information identifying a particular service to be provided to user device 210 for a particular period of time and at a particular location. Base station 220 may determine an allocation of network resources for providing the particular service to user device 210 for the particular period of time and at the particular location. Base station 220 may generate a schedule that allocates network resources for providing the particular service to user device 210 for the particular period of time at the particular location and may store the generated schedule in a memory.

In some implementations, the schedule may allocate network resources in a frequency domain and/or a time domain for an uplink channel and/or a downlink channel associated with user device 210. Base station 220 may divide the uplink channel and/or the downlink channel into frames. Each of the frames may be a Type 1 frame or a Type 2 frame, and a duration of each frame may be about 10 milliseconds (ms).

The Type 1 frame may be used in Frequency Division Duplexing and may include 10 sub-frames. Each sub-frame may be divided into two slots and may be divided, in the frequency domain, into a number of resource blocks (RBs). The number of RBs for each slot may depend on a bandwidth of the connection. The Type 2 frame may be used in Time Division Duplexing. Each Type 2 frame may include 2 half frames. Each of the half frames may include 5 sub-frames. The sub-frames included in each Type 2 frame may be consecutively numbered. A first half frame of a Type 2 frame may include 5 sub-frames numbered 0-4 and a second half frame of the Type 2 frame may include 5 sub-frames numbered 5-9. At least one of a second sub-frame included in the first half frame (e.g., a sub-frame number 1) or a second sub-frame included in the second half frame (e.g., a sub-frame numbered 7) may contain switch information. The sub-frames in the first half frame and the first sub-frame in the second half frame may be reserved for downlink transmission. The remaining sub-frames in the second half frame may be used for downlink transmission or uplink transmission. The sub-frames used for uplink transmission and the sub-frames used for downlink transmission may have a same structure as sub-frames included in a Type 1 frame. The schedule may assign particular scheduling blocks to user device 210 for the uplink transmission direction and/or the downlink transmission direction. Each scheduling block may include a particular quantity of RBs, such as, for example, two consecutive RBs.

In some implementations, base station 220 may determine bandwidth requirements, quality of service (QoS) requirements, and/or quality of experience (QoE) requirements associated with a type of traffic (e.g., voice, data, etc.) being transmitted between base station 220 and user device 210. Base station 220 may generate a schedule that assigns particular scheduling blocks to user device 210 based on the bandwidth requirements, the QoS requirements, and/or the QoE requirements associated with the type of traffic.

For example, base station 220 may receive information indicating a bandwidth, a QoS, and/or a QoE associated with base station 220 and/or another base station 220 currently providing and/or that has previously provided the particular service to user device 210. Base station 220 may generate a schedule that assigns scheduling blocks to provide user device 210 with a same or similar bandwidth, a same or similar QoS, and/or a same or similar QoE associated with base station 220 and/or the other base station 220 currently providing and/or has previously provided the particular service to user device 210.

In some implementations, base station 220 may generate a schedule based on providing an optimal channel quality (e.g., an uplink channel quality and/or an downlink channel quality that meets QoS requirements associated with the particular service). Additionally, or alternatively, base station 220 may determine a schedule based on optimizing an overall QoS of a network (e.g., network 290).

In some implementations, base station 220 may determine that the request to reserve network resources is associated with network resources of another base station 220. For example, base station 220 may determine that network resources are to be reserved along a route of travel identified in the request. Base station 220 may determine that a first portion of the route of travel is associated with network resources of base station 220 and that a second portion of the route of travel is associated with network resources of another base station 220. Base station 220 may generate a first schedule allocating network resources of base station 220 along the first portion of the route of travel and may generate a second schedule allocating network resources of the other base station 220 along the second portion of the route of travel.

In some implementations, base station 220 may send the second schedule to the other base station 220. In some implementations, base station 220 may send the second schedule to server device 280. Server device 280 may determine that the second schedule is associated with network resources of the other base station 220 and may send the second schedule to the other base station 220. The other base station 220 may reserve network resources for user device 210 based on the receiving the second schedule.

In some implementations, the schedule may include information associating the schedule with user device 210. The included information may allow base station 220 to obtain and/or provide the schedule to user device 220. For example, the schedule may include information identifying user device 210 (e.g., the identifier identifying the user and/or user device 210 included in the request to reserve network resources), information identifying the particular service, information identifying the particular location, and/or information identifying the particular period of time.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6:
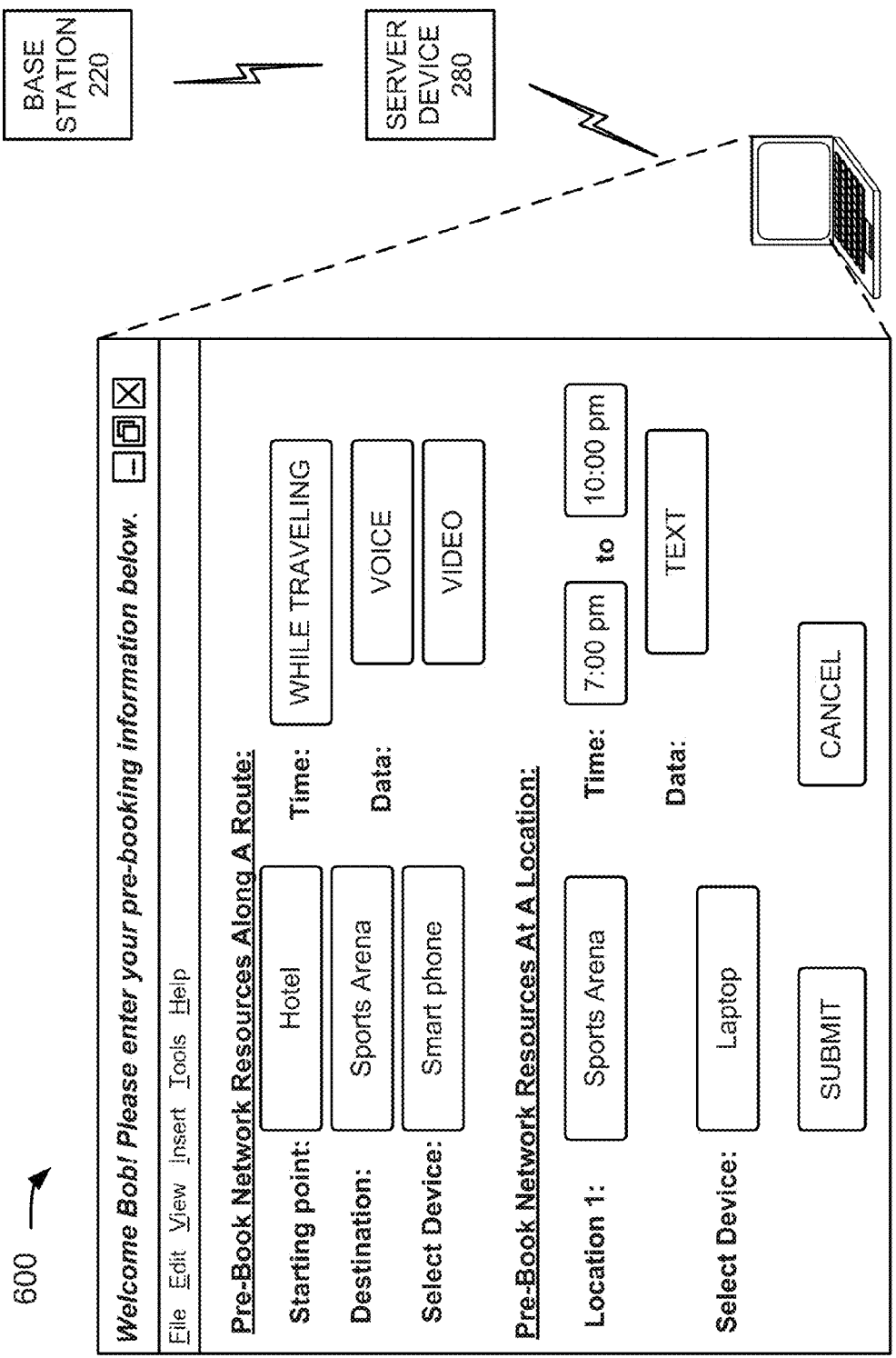
FIG. 6 is a diagram illustrating an example of the process described with respect to FIG. 5.

FIG. 6 is a diagram illustrating an example 600 of the process described with respect to FIG. 5. Referring to FIG. 6, assume that a user named Bob is a reporter covering a live sporting event being played at a sports arena. Further, assume that Bob wants to ensure that he is able to make telephone calls and stream video while driving from his hotel to the sports arena and to submit game updates while watching the game at the arena. Assume that Bob has used his laptop computer to log in to a service for reserving network resources and that the service has provided a user interface to enable Bob to provide information related to reserving the network resources.

As shown in FIG. 6, Bob may enter information indicating that he would like to reserve network resources to be able to transmit voice data and video data using his smart phone while traveling to the sports arena from the hotel. Additionally, Bob may enter information indicating that he would like to reserve network resources to be able to transmit text data from the sports arena during the game. Bob may select the "SUBMIT" button to cause the laptop computer to send the information to server device 280.

Server device 280 may receive the information. Assume that server device 280 determines that base station 220 is associated with a geographic area that includes the hotel and the sports arena. Server device 280 may generate a request to reserve network resources based on the information provided by Bob and may transmit the request to base station 220. Base station 220 may receive the request from server device 280 and may reserve and/or allocate network resources for Bob to transmit voice data and video data while traveling from the hotel to the sports arena using his smart phone. Additionally, base station 220 may reserve and/or allocate network resources for Bob to transmit text data using his laptop computer from the sports arena during the hours of 7:00 pm until 10:00 pm.

As indicated above, FIG. 6 is provided merely as an example. Other examples are possible and may differ from what was described with regard to FIG. 6.

Figure 7A:
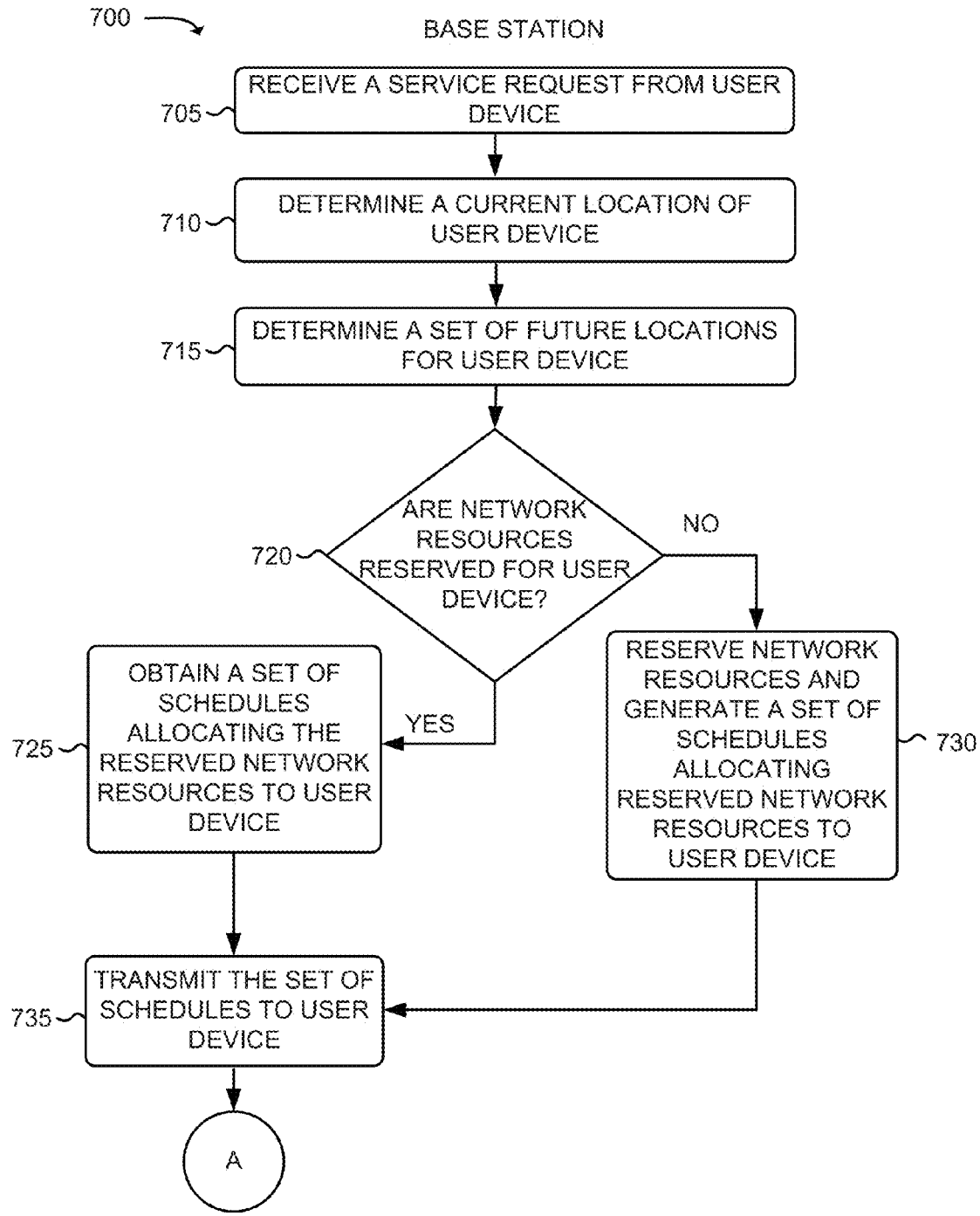
FIGS. 7A-7C are a flow chart of an exemplary process for allocating network resources.
Figure 7B:
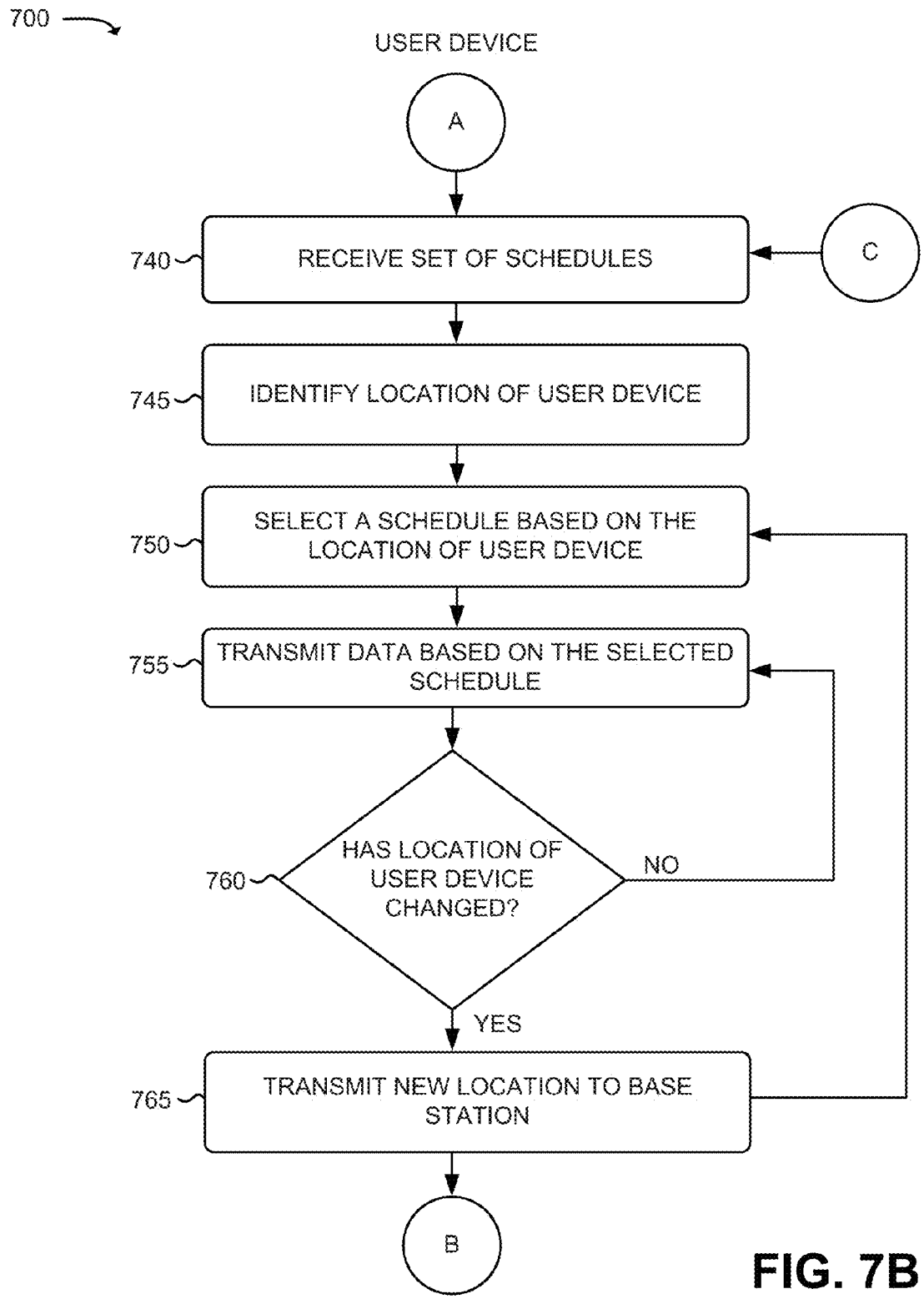
Figure 7C:
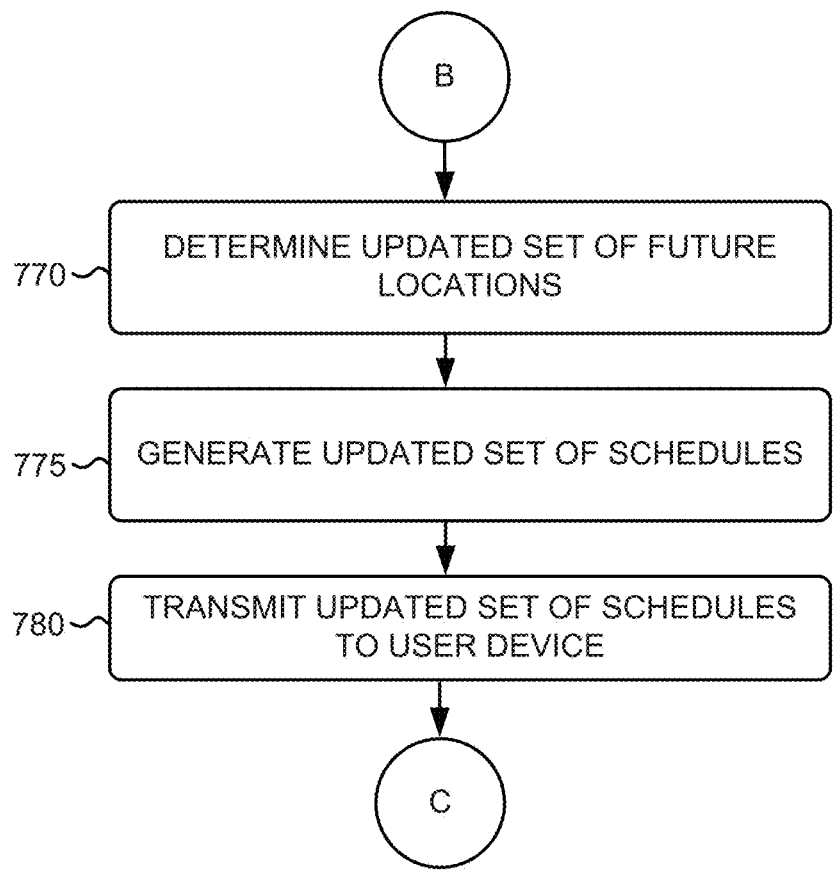

FIGS. 7A-7C are a flow chart of an example process 700 for allocating network resources. In some implementations, process 700 may be performed by base station 220 and/or user device 210. In other implementations, one or more blocks of process 700 may be performed by one or more devices instead of, or possibly in conjunction with, base station 220 and/or user device 210.

As shown in FIG. 7A, process 700 may include receiving a service request from user device 210 (block 705, FIG. 7A). For example, base station 220 may receive a service request from user device 210. In some implementations, user device 210 may connect to a network (e.g., network 290) via base station 220. After connecting to the network, user device 210 may generate and transmit a service request for a service (e.g., an Internet service, an IMS service, a voice service, etc.) to base station 220.

Process 700 may include determining a current location of user device 210 (block 710). For example, base station 220 may determine a current location of user device 210. In some implementations, user device 210 may transmit information indicating a current location of user device 210 to base station 220. Base station 220 may determine a current location of user device 210 based on the transmitted information. For example, user device 210 may include a global positioning system (GPS) component. User device 210 may use the GPS component to determine a current location of user device 210. User device 210 may send information indicating the current location of user device 210 to base station 220. In some implementations, the information indicating the current location of user device 210 may be included in the service request. Additionally, or alternatively, user device 210 may send the information indicating the current location of user device 210 periodically, when polled by base station 220, and/or when user device 210 moves from one location to another location.

In some implementations, base station 220 may obtain information relating to the current location of user device 210 from an application layer of user device 210. For example, a social networking application may be running on user device 210. The user may set a permission indicating that the social networking application may provide information regarding the current location of the user (e.g., user device 210) to base station 220. Base station 220 may request, from the social networking application, information regarding the current location of user device 210. The social networking application may determine information regarding the current location of user device 210 based on information provided by the user via the social networking application (e.g., a status update indicating that the user is currently located at a particular location) and may provide the information to base station 220.

In some implementations, base station 220 may determine the current location of user device 210 based on other information (e.g., information other than location information received from user device 210). For example, base station 220 may determine the current location of user device 210 based on a radio signal strength triangulation relative to three or more base stations, a physical proximity of user device 210 to one or more known fixed wireless networks with known geographic locations, and/or other types of information relating to the current location of user device 210.

Process 700 may include determining a set of future locations for user device 210 (block 715). For example, base station 220 may determine a set of future locations for user device 210. In some implementations, base station 220 may determine the set of future locations based on the current location of user device 210. For example, the geographic area around the current location of user device 210 may be associated with multiple, different base stations 220 and the set of future locations may correspond to geographic areas associated with the multiple base stations 220.

Additionally, or alternatively, base station 220 may determine the set of future locations based on historical travel information associated with the current location of user device 210. For example, base station 220 may obtain historical travel information associated with the current location of user device 210. Based on the historical travel information, base station 220 may determine that the current location of user device 210 is associated with a particular route of travel (e.g., a route a user of user device 210 commonly travels to go to work, a particular road system and/or rail system frequently traveled by commuters during a particular time of day, etc.). Base station 220 may determine the set of future locations based on the particular route of travel.

In some implementations, the set of future locations may be quantized to consist of a set of centroids of regions that are positioned around a current location of user device 210. In some implementations, a granularity (e.g., a quantity and size) of the regions may depend on geographic characteristics and/or network characteristics associated with the geographic area around the current location of user device 210. For example, base station 220 may determine geographic characteristics (e.g., terrain features, population densities, weather conditions at the current location, weather conditions between the current location and a location of a base station 220, etc.) and/or transmission characteristics (e.g., number of user devices, number of base stations, inter-cell interference considerations, information regarding uplink channel quality and/or downlink channel quality, etc.) associated with the geographic area around the current location of user device 210. Base station 220 may divide the geographic area into different regions based on differences in one or more geographic characteristics and/or one or more transmission characteristics.

In some implementations, base station 220 may receive information identifying a route of travel associated with user device 210. A user of user device 210 may use a navigation application to determine a route for traveling to a particular destination. The navigation application may determine driving directions for travelling to the particular destination and may send the driving directions to base station 220. In some implementations, the navigation application may be included on user device 210 and may cause user device 210 to send the driving directions to base station 220. In some implementations, base station 220 may receive the driving directions from another device. For example, the navigation application may be included in a navigation system of a vehicle of the user. The navigation application may send the driving directions and information identifying the user and/or user device 210 to base station 220.

Process 700 may include determining whether network resources are reserved for user device 210 (block 720). For example, base station 220 may parse the service request to obtain information identifying the user and/or user device 210. Base station 220 may determine whether network resources are reserved for user device 210 based on the obtained information. In some implementations, base station 220 may use the information identifying the user and/or user device 210 to determine whether a set of schedules, associated with the user and/or user device 210 are stored in a memory associated with base station 220.

In some implementations, base station 220 may send a request to server device 220. The request may include information identifying the user and/or user device 210. Server device 220 may receive the request and determine whether network resources have been reserved for the user device 210 based on the information identifying the user and/or user device 210. Server device 220 may send a response to the request to base station 220. The response may indicate whether network resources have been reserved for user device 210 and/or information for retrieving a set of schedules allocating reserved network resources to user device 210 from a memory.

In those instances where network resources are reserved for user device 210 (block 720—YES), process 700 may include obtaining a set of schedules allocating the reserved network resources to user device 210 (block 725). For example, base station 220 may retrieve a set of schedules allocating RBs to user device 210 at the current location and the set of future locations from a memory associated with base station 220. In some implementations, base station 220 may retrieve the set of schedules from the memory based on information included in the service request (e.g., information identifying the user and/or user device 210). In some implementations, base station 220 may retrieve the set of schedules based on information received from another device (e.g., information included in a response received from server device 220).

In some implementations, one or more future locations, of the set of future locations, may be associated with another base station 220. Base station 220 may obtain one or more schedules, of the set of schedules from the other base station 220. In some implementations, base station 220 may request the one or more schedules from the other base station 220. The other base station 220 may receive the request and send the one or more schedules and/or information for obtaining the one or more schedules (e.g., information for retrieving the one or more schedules from a memory and/or information for generating one or more schedules allocating resources reserved for user device 210 by the other base station 220).

In those instances where network resources have not been reserved for user device 210 (block 720—NO), process 700 may include reserving network resources and determining a set of schedules allocating the reserved network resources to user device 210 (block 730). For example, base station 220 may reserve network resources allocating network resources to user device 210 at the current location and the set of future locations and may generate a set of schedules allocating the reserved network resources to user device 210 as described in connection with block 530.

Process 700 may include transmitting the set of schedules to user device 210 (block 735). For example, base station 220 may transmit the set of schedules to user device 210. In some implementations, one or more future locations, of the set of future locations, may be associated with another base station 220 and base station 220 or another device may transmit the one or more schedules to user device 210 (e.g., the other base station 220).

Process 700 may include receiving the set of schedules (block 740, FIG. 7B). For example, user device 210 may receive the set of schedules from base station 220. Additionally, or alternatively, user device 210 may receive one or more schedules, of the set of schedules, from another device (e.g., another base station 220).

Process 700 may include identifying a location of user device 210 (block 745) and selecting a schedule based on the location of user device 210 (block 750). For example, user device 210 may identify the current location of user device 210 and may select a schedule, from the set of schedules, based on the location of user device 210. In some implementations, each schedule may include information identifying a location and/or geographic area associated with the schedule. User device 210 may select a schedule associated with the current location of user device 210 based on the information identifying the location and/or geographic area associated with the schedule.

Process 700 may include transmitting data based on the selected schedule (block 755). For example, user device 210 may transmit data based on the selected schedule. User device 210 may store the remaining schedules (e.g., the schedules not associated with the current location of user device 210) in a memory (e.g., memory 330).

Process 700 may include determining whether a location of user device 210 has changed (block 760). For example, user device 210 may determine whether a location of user device 210 has changed (e.g., whether user device 210 has moved from the current location to a new location). In some implementations, user device 210 may include a GPS component and may use the GPS component to determine whether a location of user device 210 has changed. For example, user device 210 may use the GPS component to periodically determine a location of user device 210.

In some implementations, user device 210 may determine that the location of user device 210 has changed when the location of user device 210 is no longer associated with the selected schedule and/or is associated with a schedule other than the selected schedule. For example, user device 210 may determine a location for user device 210. User device 210 may determine whether the location is associated with the selected schedule and/or a different schedule (e.g., a schedule, of the set of schedules, other than the selected schedule). User device 210 may determine that the location of user device 210 has changed when the location of user device 210 is not associated with the selected schedule and/or is associated with the different schedule.

Additionally, or alternatively, user device 210 may determine whether the location of user device has changed based on information received from another device (e.g., base station 220). For example, base station 220 may determine a location of user device 210 and may send information identifying the location to user device 210. User device 210 may receive the information identifying the location of user device 210 and may determine whether the location of user device 210 has changed based on the received information.

In those situations where the location of user device 210 has not changed (block 760—NO), process 700 may continue as described in connection with block 755 and user device 210 may continue to transmit data based on the selected schedule.

In those situations where the location of user device 210 has changed (block 760—YES), process 700 may include transmitting the new location to base station 220 (block 765). For example, user device 210 may transmit information identifying the new location of user device 210 to base station 220. In some implementations, user device 210 may transmit the new location to base station 220 by performing a three-way handshake with base station 220. For example, user device 210 may transmit a synchronization (SYN) message to base station 220. The SYN message may include information indicating the new location of user device 210. Base station 220 may receive the SYN message. Base station 220 may transmit a synchronization and acknowledgement (SYN+ACK) message to user device 210 in response to the SYN message. User device 210 may receive the SYN+ACK message and may transmit an acknowledgement (ACK) message to base station 220 in response to the SYN+ACK message. Upon transmitting the ACK message, process 700 may continue, as described in connection with block 750, with user device 210 selecting a new schedule based on the new location of user device 210.

Process 700 may include determining an updated set of future locations (block 770, FIG. 7C). For example, base station 220 may receive the information identifying the new location from user device 210. Base station 220 may determine an updated set of future locations for user device 210 based on the new location. In some implementations, base station 220 may determine the updated set of future locations as described in connection with block 715.

Process 700 may include generating an updated set of schedules (block 775). For example, base station 220 may generate an updated set of schedules based for the updated set of future locations. In some implementations, base station 220 may generate the updated set of schedules as described in connection with block 730. In some implementations, the updated set of schedules may include schedules for some, but not all, of the future locations. For example, one or more future locations, included in the updated set of future locations, may also be included in the set of future locations. Base station 220 may not generate schedules for the one or future locations that are also included in the set of future locations.

Process 700 may include transmitting the updated set of schedules to user device 210 (block 780). For example, base station 220 may transmit the updated set of schedules to user device 210 and process 700 may continue as described in connection with block 740.

While FIGS. 7A-7C show process 700 as including a particular quantity and arrangement of blocks, in some implementations, process 700 may include fewer blocks, additional blocks, or a different arrangement of blocks. Additionally, or alternatively, some of the blocks may be performed in parallel.

Figure 8A:
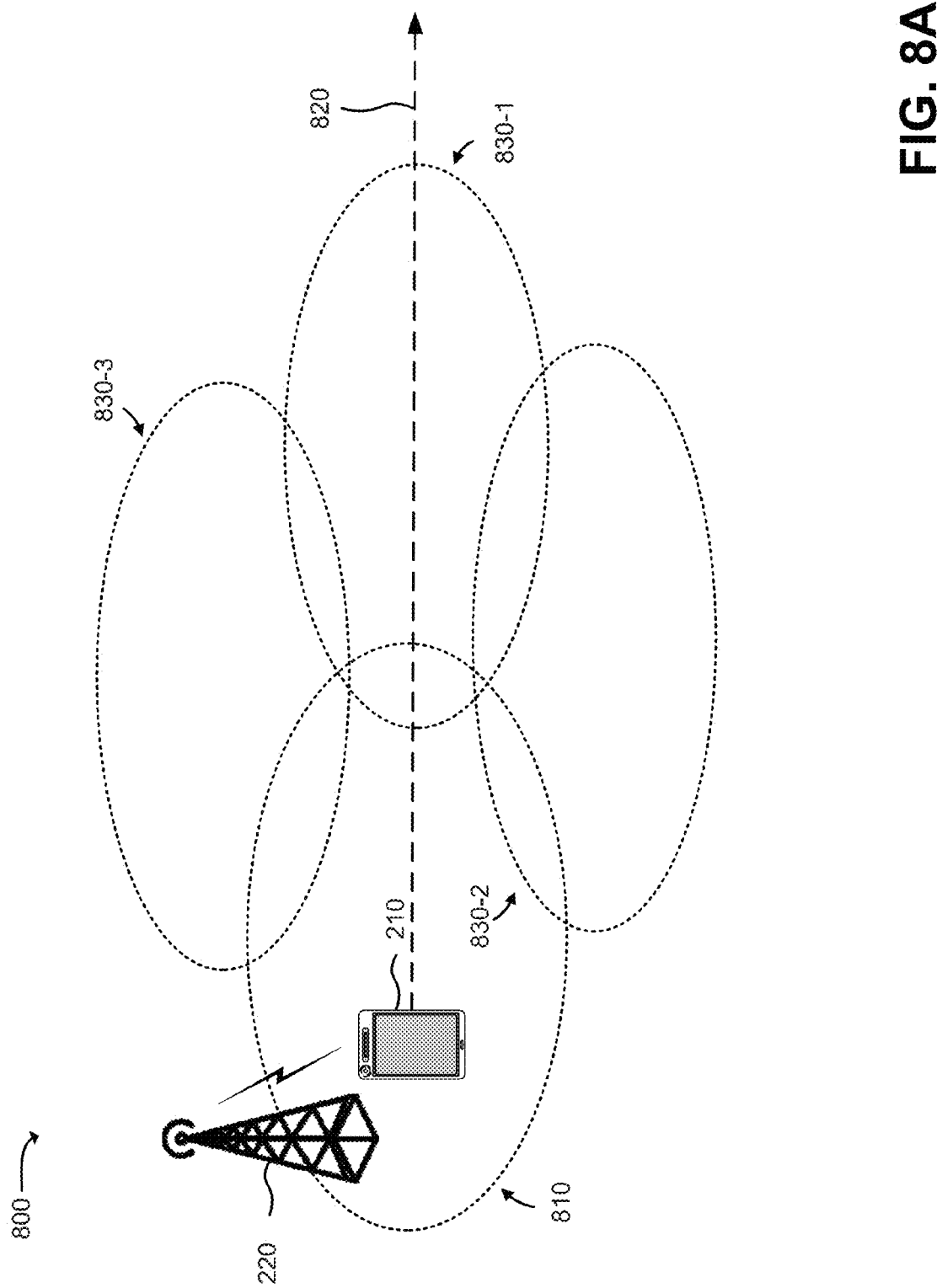
FIGS. 8A and 8B are diagrams illustrating an example of the process described with respect to FIGS. 7A-7C.
Figure 8B:
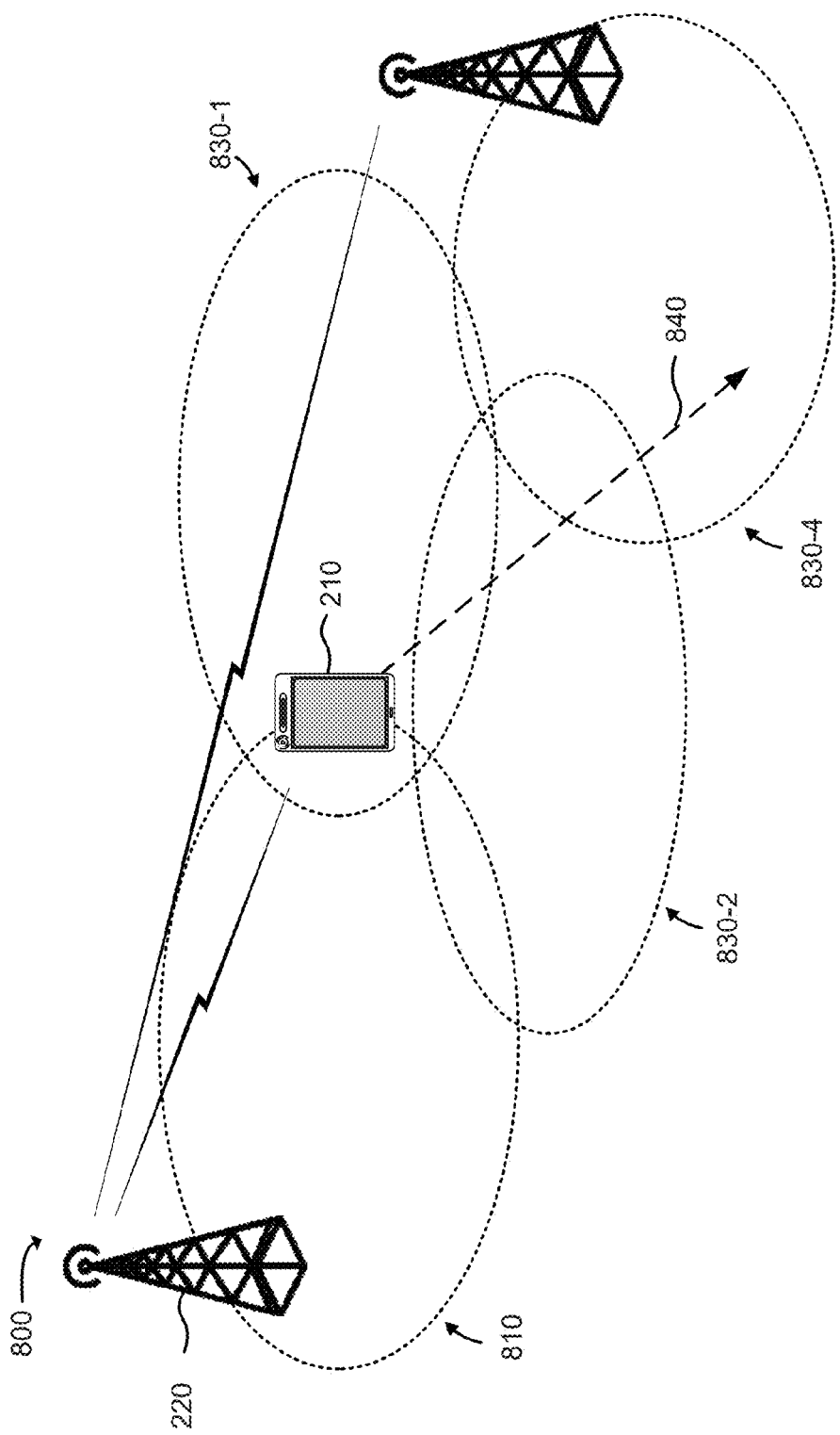

FIGS. 8A and 8B are diagrams illustrating an example 800 of the process described with respect to FIG. 7. For FIG. 8A, assume that user device 210 has detected and connected to base station 220 and that user device 210 has sent base station 220 a service request that includes information identifying user device 210 and information identifying a current location (area 810) of user device 210. Assume that base station 220 has received the service request and has parsed the service request to determine a service to be provided to user device 210 and the current location of user device 210. Assume that base station 220 has determined a physical trajectory 820 of user device 210 and, based on the current location of user device 210 and physical trajectory 820, base station 220 has determined a set of future locations (areas 830-1-830-3) for user device 210.

Base station 220 may determine geographic and network characteristics associated with areas 810 and 830-1-830-3 and may generate a set of schedules allocating network resources to user device 210 at the current location and the set of future locations. Base station 220 may include information identifying an associated area in each schedule included in the set of schedules. Base station 220 may transmit the set of schedules to user device 210.

User device 210 may receive the set of schedules from base station 220. User device 210 may identify a location of user device 210 (e.g., area 810) and may select the schedule associated with the location of user device 210 based on the information identifying the associated area included in the schedules. User device 210 may begin transmitting data based on the selected schedule.

Referring to FIG. 8B, assume that user device 210 has moved to a new location and determines the new location of user device 210. Assume that, based on the new location, user device 210 determines that user device 210 is about to leave area 810 and that user device 210 has entered into area 830-1. User device 210 may select the schedule for area 830-1 based on the information identifying the associated area included in the schedule for area 830-1. User device 210 may perform a 3-way handshake with base station 220 to transmit the new location to base station 220 and to notify base station 220 that user device 210 will begin transmitting data based on the schedule for area 830-1.

Based on the new location for user device 210, base station 220 may determine a set of future locations that includes, for example 800, areas 830-2 and 830-4. Base station 220 may determine that 830-2 is included in the set of future locations and that base station 220 has previously generated and provided a schedule for area 830-2 to user device 210. Base station 220 may determine that area 830-4 is not included in the set of future locations. Base station 220 may generate a schedule allocating network resources to user device 210 for area 830-4. Base station 220 may transmit the schedule to user device 210. Base station 220 may determine that area 830-4 is associated with another base station and may transmit the schedule to the other base station to cause the other base station to reserve the allocated network resources.

As user device 210 continues to move from the new location to another location, base station 220 and/or the other base station may continuously in time extrapolate near term sets of future locations of user device 210 and may generate updated sets of schedules based on radio propagation characteristics between user device 210, base station 220, and/or the other base station. The updated sets of schedules may be transmitted to user device 210 to prevent user device 210 from experiencing a change in a radio channel quality that may result from changing radio propagation characteristics.

As indicated above, FIGS. 8A and 8B are provided merely as an example. Other examples are possible and may differ from what was described with regard to FIGS. 8A and 8B.

The foregoing description provides illustration and description, but is not intended to be exhaustive or to limit the embodiments to the precise form disclosed. Modifications and variations are possible in light of the above teachings or may be acquired from practice of the implementations.

As used herein, the term device is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A non-transitory computer-readable medium storing instructions, the instructions comprising:
   one or more instructions that, when executed by a processor of a base station associated with a cellular network, cause the processor to:
   receive a request for a service from a user device;
   determine a current location of the user device;
   determine, based on the current location, a set of future locations for the user device;
   determine whether network resources have been reserved for the user device;
   selectively retrieve a set of schedules from a memory when the network resources have been reserved for the user device,
   the set of schedules allocating network resources to the user device at the current location and each future location of the set of future locations;
   selectively generate the set of schedules for the current location and the set of future locations when the network resources have not been reserved for the user device;
   and
   transmit the set of schedules to the user device.

2. The non-transitory computer-readable medium of claim 1, where the instructions further comprise:
   one or more instructions that, when executed by the processor, cause the processor to:
   quantize the set of future locations to consist of a set of centroids of regions located around the current location of the user device; and
   where the one or more instructions to generate the set of schedules further cause the processor to:
   generate the set of schedules for the current location for the regions located around the current location of the user.

3. The non-transitory computer-readable medium of claim 1, where the instructions further comprise:
   one or more instructions that, when executed by the processor, cause the processor to:
   receive information identifying a route of travel associated with the user device; and
   where the one or more instructions to determine the set of future locations further cause the processor to:
   determine the set of future locations based on the route of travel.

4. The non-transitory computer-readable medium of claim 3, where the instructions further comprise:
   one or more instructions that, when executed by the processor, cause the processor to:
   determine that a portion of the route of travel is associated with network resources of another base station; and
   transmit a schedule, of the set of schedules, to the other base station to cause the other base station to reserve network resources along the portion of the route of travel for the user device.

5. The non-transitory computer-readable medium of claim 4, where the instructions further comprise:
   one or more instructions that, when executed by the processor, cause the processor to:
   receive information indicating a new location of the user device;

determine, based on the new location, an updated set of future locations for the user device;
generate a set of schedules allocating network resources to the user device for the updated set of future locations; and
transmit the set of schedules allocating the network resources to the user device for the updated set of future locations to the user device.

6. The non-transitory computer-readable medium of claim 5, where the instructions further comprise:
one or more instructions that, when executed by the processor, cause the processor to:
determine that a future location, of the updated set of future locations, is included in the set of future locations; and
determine not to generate a schedule for the future location based on the future location being included in the set of future locations.

7. A device comprising:
a processor to:
receive, at a first location and from a base station associated with a cellular network, a first schedule and a second schedule,
the first schedule being associated with a first allocation of network resources for transmitting data within a first region,
the first schedule including information identifying the first region,
the first location being within the first region,
the second schedule being associated with a second, different allocation of network resources for transmitting data within a second region, and
the second region being different from the first region;
determine that the first schedule is associated with the first location based on the information identifying the first region;
select the first schedule for transmitting data from the first location based on the first schedule being associated with the first region;
transmit data within the first region based on the first schedule;
determine that the device has moved from the first location to a second location,
the second location being within the second region; and
transmit, based on the second location being within the second region, data based on the second schedule.

8. The device of claim 7, where the processor is further to:
transmit a request to reserve network resources along a particular route,
the first location and the second location being along the particular route, and
where, when receiving the first schedule and the second schedule, the processor is to:
receive the first schedule and the second schedule based on transmitting the request to reserve network resources along the particular route.

9. The device of claim 8, where, when transmitting the request to reserve the network resources, the processor is to:
access an application for reserving network resources,
provide, via the application, information identifying the particular route, and
transmit the request to reserve the network resources,
the application generating the request to reserve the network resources based on the information identifying the particular route, and
the application causing the device to transmit the request to reserve the network resources to the base station.

10. The device of claim 8, where, when transmitting the request to reserve the network resources, the processor is to:
transmit the request to reserve the network resources from a third location that is different from the first location and the second location.

11. The device of claim 7, where, when receiving the first schedule and the second schedule, the processor is to:
receive the first schedule from the base station, and
receive the second schedule from another base station associated with the second region.

12. A method comprising:
receiving, by a base station and during a first period of time, a request to reserve network resources for providing a service to a user device during a second period of time, the second period of time being subsequent to the first period of time;
generating, by the base station and based on the request to reserve the network resources, a schedule allocating the network resources to the user device during the second period of time;
receiving, by the base station, a request to provide the service to the user device,
the request being received from the user device during the second period of time;
transmitting, by the base station, the schedule to the user device for providing the service to the user device during the second period of time;
determining a set of future locations of the user device;
quantizing the set of future locations to consist of a set of centroids;
generating a set of schedules for the set of future locations based on the set of centroids,
the set of schedules allocating network resources for providing the service to the user device at each location included in the set of locations; and
sending the set of schedules to the user device.

13. The method of claim 12, where the user device includes a first user device and receiving the request to reserve the network resources includes:
receiving the request to reserve the network resources from a second user device that is different from the first user device.

14. The method of claim 12, further comprising:
determining, based on receiving the request to provide the service, a current location of the user device; and
where determining the set of future locations of the user device is based on the current location of the user device.

15. The method of claim 14, where quantizing the set of future locations further comprises:
quantizing the set of future locations to consist of the set of centroids of regions located around the current location of the user device.

16. The method of claim 15, where generating the set of schedules includes:
generating the set of schedules for the regions located around the current location of the user device.

17. The method of claim 12, where the request to reserve the network resources includes information identifying a route of travel associated with the user device, and
where generating the schedule includes:
generating the schedule allocating the network resources along the route of travel.

18. The method of claim 17, where generating the schedule allocating the network resources along the route of travel includes:

generating a first schedule allocating first network resources along a first portion of the route of travel,
the first network resources being associated with the base station,
generating a second schedule allocating second network resources along a second portion of the route of travel,
the second network resources being associated with another base station, and
transmitting the second schedule to the other base station.

19. The non-transitory computer-readable medium of claim 2, where a granularity of the regions is based on a geographic characteristic associated with a geographic area around the current location.

20. The method of claim 15, where a granularity of the regions is based on a network characteristic associated with a geographic area around the current location.

\* \* \* \* \*